United States Patent [19]
Ashida et al.

[11] 3,868,568
[45] Feb. 25, 1975

[54] SPECTRUM ANALYZER

[75] Inventors: Hitoshi Ashida; Kenichiro Yasaka; Motosuke Tanabe; Yuuji Yoshino, all of Gyoda City, Japan

[73] Assignee: Takeda Riken Industry Company Limited, Tokyo, Japan

[22] Filed: June 18, 1973

[21] Appl. No.: 370,674

[30] Foreign Application Priority Data
June 20, 1972  Japan............................. 47-61524

[52] U.S. Cl............................................ 324/77 CS
[51] Int. Cl............................................ G01r 23/16
[58] Field of Search ............ 324/77 C, 77 CS, 77 R

[56] References Cited
UNITED STATES PATENTS
3,045,233  7/1962  Katz et al. ..................... 324/77 Cs
3,110,861  11/1963  Hurvitz ........................... 324/77 CS Primary Examiner—Michael J. Lynch
Attorney, Agent, or Firm—William J. Daniel

[57] ABSTRACT

A spectrum analyzer of the heterodyne type including a local oscillator having voltage controlled frequency, first mixer means coupled to receive a spectrum of input frequencies and to mix them with said frequency from the local oscillator and produce intermediate frequencies, narrow band filter means coupled to receive said intermediate frequencies and to select substantially one frequency thereof, second mixer means connected to mix said local oscillator frequency and the output of said filter means and deliver an output frequency corresponding with a selected input frequncy, counter means, timed interval gate means operative when actuated to admit cycles of said output frequency of the second mixer means into said counter means, waveform generator means operative to generate series of waveforms including interspersed ramp waveforms and square waveforms, oscillograph means having a first-axis input connected to receive for display components of intermediate frequencies selected by the filter means and having a second-axis input connected to receive said waveforms to sweep the oscillograph means, and said square waveform being coupled to actuate said gate means to admit said selected frequency into the counter means to have its cycles counted for the duration of said interval.

4 Claims, 5 Drawing Figures

SPECTRUM ANALYZER

This invention relates to a spectrum analyzer for analyzing the frequency of an electric signal.

In prior art conventional spectrum analyzers, the frequency of a reference substitute oscillator substantially equal to the analyzed frequency of a signal is measured, therefore errors are made in the measured frequency of a signal and an accurate measurement has been impossible.

An object of the present invention is to provide an apparatus wherein a desired component is selected from among spectra, its frequency can be measured with a high accuracy with a counter and such defects as are mentioned above are not present.

Another object of the present invention is to provide an apparatus wherein a spectrum is indicated and at the same its frequency can be measured with high sensitivity.

The present invention shall be explained more particularly in the following.

Figure 1:
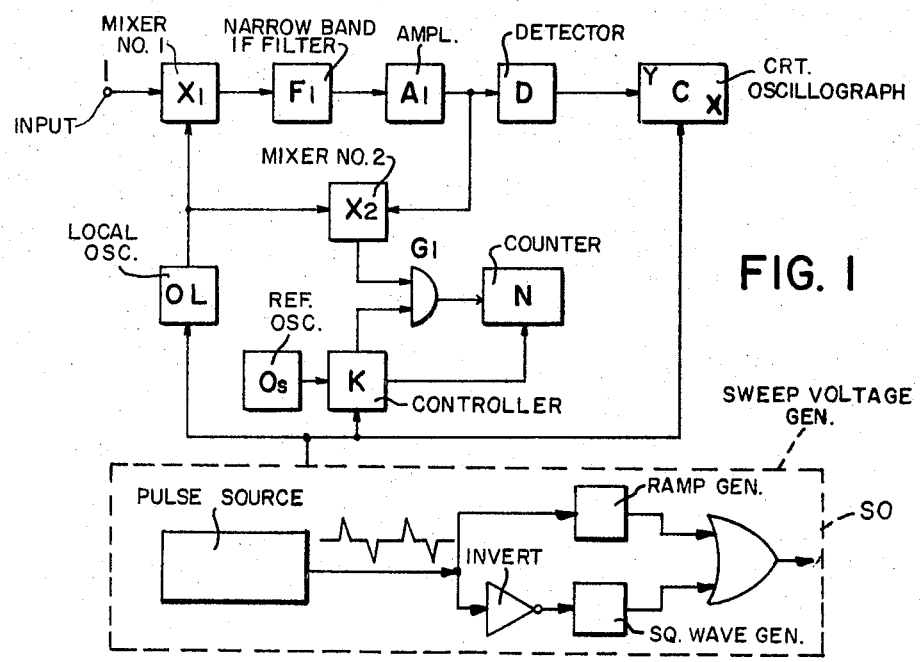
FIG. 1 is a block diagram showing an embodiment of the present invention.

In the embodiment of the present invention shown in FIG. 1, a signal to have the frequency analyzed is applied to an input terminal 1. This signal and an output of a local oscillator OL of a voltage controlled variable frequency type are mixed in a mixer $X_1$ and the output signal of mixer $X_1$ is applied to an intermediate frequency wave filter $F_1$ of narrow band. Its output signal is amplified in the amplifier $A_1$ and becomes a Y-axis input of a cathode ray tube oscillograph device C through the detector D. Therefore, by controlling the local oscillator OL with a sweep voltage and making the sweep voltage a X-axis input of the oscillographing device C, as well known, a spectrum of the signal can be obtained.

In such spectrum analyzer, the output of the above mentioned amplifier $A_1$ is mixed with the output of the local oscillator OL in the mixer $X_2$ and its output is applied to a gate $G_1$.

Figure 2:
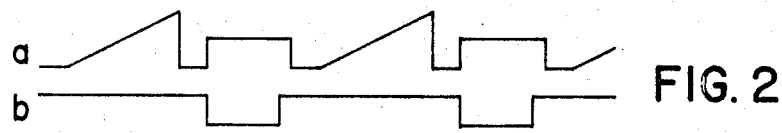
FIG. 2a is a view showing an output wave form of a sweep voltage generator SO.
FIG. 2b is a view showing a wave form of a gate opening or closing signal from a controller K.

On the other hand, for example, the sweep voltage generator SO is designed to alternately generate sweep voltages and square wave voltages as shown in FIG. 2a. Such sweep voltage generator can be easily obtained, as indicated in FIG. 1; by generating a sweep or ramp voltage at the time of a positive pulse and a square wave voltage at the time of a negative pulse, for example, with alternate positive and negative trigger pulses from a stable pulse source, e.g., a free-running multivibrator. Moreover, if the amplitude of the square wave voltage of said generator is made freely variable, when the square wave voltage is applied to the local oscillator OL, the oscillation frequency of said oscillator will become a desired fixed frequency and therefore any desired component will be able to be selected from among the spectra of the measured signal. Further, as the output of the above mentioned sweep voltage generator SO is made an X-axis input of the oscillograph device C, the desired component in the above mentioned spectra will appear as a bright point or black point in a position on the X-axis and the particular component which is being selected will be clearly shown.

Further, the output of the above mentioned generator is applied also to the controller. To said controller K is applied also a signal from a reference oscillator $O_s$ which properly generates and sends out accurate oscillation frequency signals as in a crystal oscillator.

Therefore, in case the output of the sweep voltage generator SO is a square wave voltage, said controller will be actuated by the rise of the output waveform of the reference oscillator $O_s$ and will send out such accurate gate opening and closing signals as in FIG. 2b and will also generate a resetting signal for resetting the counted value of the counter N from another output signal after a proper time.

Now, as described above, the output of the amplifier $A_1$ and the output of the voltage controlled type variable frequency local oscillator OL are mixed in the mixer $X_2$ and its output is applied to the gate $G_1$. As the output frequency of said mixer $X_2$ is equal to the input signal component being selected to have its frequency measured, the apparatus of the present invention is intended to open and then close the gate $G_1$ with the interval between the gate opening and closing signals from the controller K being controlled by the period of the frequency as in the above described crystal oscillator, during which interval the counter N will count the output frequency of the above mentioned mixer $X_2$ and indicate the counted result (not illustrated).

Figure 3:
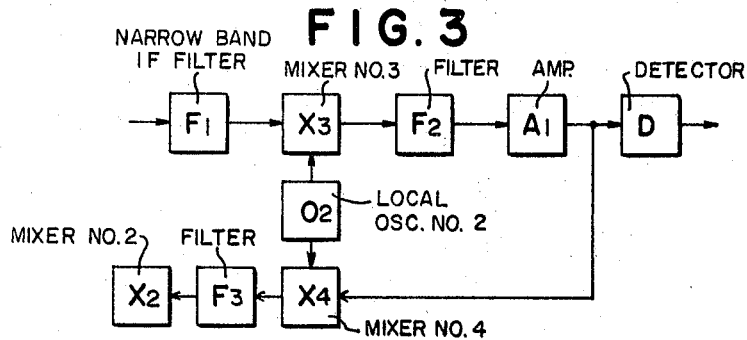
FIG. 3 is a block diagram showing additional circuitry addable to FIG. 1 to provide another embodiment of the present invention.

Referring to FIG. 3, in the case of a measured signal of a higher frequency, it can easily be seen that the measurement will be attained by using mixers $X_3$ and $X_4$ and a comparatively stable fixed oscillator $O_2$ as shown in FIG. 3.

Figure 4:
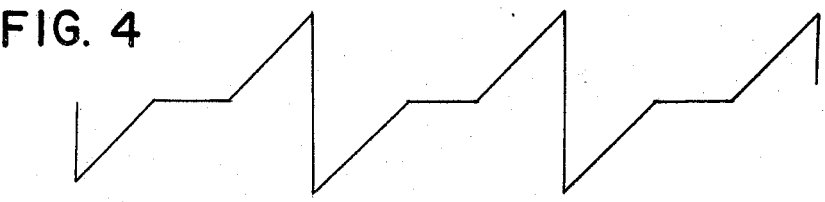
FIG. 4 is a view showing an alternative wave form for the output of the sweep voltage generator SO.

Further, though the sweep voltage generator SO has been explained to alternately generate a sweep voltage and square wave voltage, it need not generate them always alternately but may generate either at inervals of any times or a voltage corresponding to the square wave voltage may be interposed in the course of one cycle of the sweep, as depicted in FIG. 4.

As described above, the present invention is to provide an apparatus wherein an accurate frequency measurement with the accuracy of a crystal oscillator can be attained with a high sensitivity as of a spectrum analyzer while selecting a desired component from among spectra simultaneously with indicating the spectra without being accompanied with such errors as in the frequency measurement with a conventional spectrum analyzer using a substitute oscillator.

That is to say, in the conventional spectrum analyzer, the frequency of the substitute oscillator is measured and therefore errors $10^{-2}$ to $10^{-3}$ on the true measured frequency are produced. But, in the apparatus of the present invention, there is no such defect, a measurement with the accuracy of a crystal oscillator of a very high accuracy is made possible and this effect is very high.

What is claimed is:

1. A spectrum analyzer comprising, a local oscillator having voltage controlled frequency, first mixer means coupled to receive a spectrum of input frequencies and to mix them with said frequency from the local oscillator and produce intermediate frequencies, narrow band filter means coupled to receive said intermediate frequencies and to select substantially one frequency thereof, second mixer means connected to mix said local oscillator frequency and the output of said filter means and deliver an output frequency corresponding with a selected input frequency, counter means, timed-interval gate means operative when actuated to admit cycles of said output frequency of the second mixer means into said counter means, waveform generator means operative to generate series of waveforms including interspersed ramp waveforms and square wave forms, the output of said series of waveforms controlling said voltage controlled oscillator to sweep or fix the frequency thereof, oscillograph means having a first axis input connected to receive for display components of intermediate frequencies selected by the filter means and having a second axis input connected to receive said waveforms to sweep the oscillograph means, and said square waveform being coupled to actuate said gate means.

2. A spectrum analyzer as set forth in claim 1, including means for extending the frequency range of the analyzer comprising, a second local oscillator, a third mixer means coupled to the second oscillator and interposed at the output of the filter means to receive the selected intermediate frequency and operative to transpose it in one direction by a factor determined by the second oscillator frequency, and a fourth mixer means coupled to said second oscillator and interposed at the output of the second mixer means to receive its output frequency and operative to transpose it by the same factor in the opposite direction.

3. A spectrum analyzer as set forth in claim 1, wherein said waveform generator is operative to generate a series of waveforms in which said ramp waveform and said square waveforms alternate.

4. A spectrum analyzer as set forth in claim 1, wherein said waveform generator is operative to generate said ramp waveform with a square waveform interposed within a cycle of the ramp waveform.

* * * * *

UNITED STATES PATENT OFFICE
CERTIFICATE OF CORRECTION

PATENT NO. : 3,868,568
DATED : February 25, 1975
INVENTOR(S) : Hitoshi Ashida; Kenichiro Yasaka; Motosuke Tanabe; Yuuji Yoshino It is certified that error appears in the above-identified patent and that said Letters Patent are hereby corrected as shown below:

In the priority number of item [30], delete "47-615243"

and insert --47-61523--

Signed and sealed this 20th day of May 1975.

(SEAL)
Attest:

RUTH C. MASON
Attesting Officer

C. MARSHALL DANN
Commissioner of Patents
and Trademarks